United States Patent Office 3,440,899
Patented Apr. 29, 1969

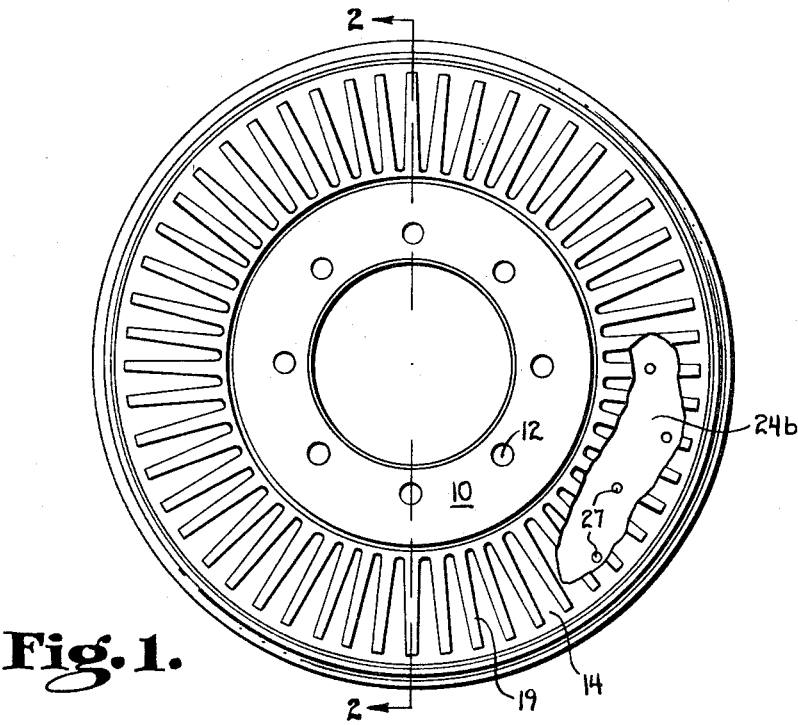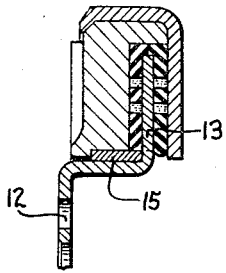

3,440,899
TUNED VIBRATION DAMPER
Sanford A. McGavern and William K. Ward, Indianapolis, Ind., assignors to Wallace-Murray Corporation, Indianapolis, Ind., a corporation of Delaware
Filed Aug. 11, 1967, Ser. No. 659,981
Int. Cl. G05g 1/00
U.S. Cl. 74—574                                                9 Claims

ABSTRACT OF THE DISCLOSURE

A damper for attachment to a torsionally vibrating member, such as the crankshaft of an internal combustion engine, the damper having an elastic member interposed between the inertia member or driven member and the hub or driving member with the elastic member having pockets formed in it which are filled with a viscous fluid, the viscous fluid and elastic element both thus acting in parallel to convert torsional vibratory energy from the shaft into thermal energy.

BACKGROUND OF THE INVENTION

Field of the invention is the damping of torsional vibration in systems such as the crankshaft of an internal combustion engine. A detailed discussion of the problems involved in this field can be found in Katzenberger U.S. Patent 3,077,123.

Description of the prior art

Dampers, utilizing an elastic component are well known in the prior art, Troyer U.S. Patent 2,972,904 and Katzenberger U.S. Patent 2,992,569 being exemplary. Dampers using a viscous fluid as the vibratory energy absorbing medium are also well known as disclosed in O'Connor U.S. Patent 2,514,139. The fluid types have the disadvantage that their manufacture requires delicate control of close dimensional tolerances. The elastic element type, particularly where subjected to torsional vibration of relatively high peak amplitudes, must utilize an elastic material whose characteristics are a compromise between high hysteresis or internal friction and a minimum change in stiffness with temperature variation, these two characteristics, in elastic elements, being antithetical.

SUMMARY OF THE INVENTION

The structure embodying the present invention divides the vibrational absorbing function between an elastic element and a viscous fluid which is encapsulated in pockets or holes in the elastic element so that when the assembly is subjected to torsional vibration, the elastic element is subjected to shear stresses and the viscous fluid is subjected to shearing and compressive stresses at its encapsulation walls. The increment of total energy conversion performed by the elastic element can be altered, by proper choice of the volume or viscosity of the viscous fluid utilized, so that elastomeric compounds having lower hysteresis characteristic but flatter stiffness versus temperature response curves may be utilized in the damper assembly. The viscous fluid, encapsulated between the inertia element and the driving member and within the elastic element, performs somewhat as a lubricant permitting the inertia element to slip with respect to the driving or inner member under peak torque conditions. This relieves the elastic member from the peak shear stresses that would otherwise be generated in it by the high torque and prolongs the service life of the elastic element. The assembly has a simplicity of structure comparable to the elastic element (only) type of damper but without the necessity of holding the close dimensional tolerance characteristic of prior art viscous fluid type dampers.

BRIEF DESCRIPTION OF THE DRAWINGS

FIG. 1 is a front view of a torsional vibration damper embodying the present invention, with a portion broken away to show the inner construction.
FIG. 2 is a side sectional view taken generally along the line 2—2 of FIG. 1.

DESCRIPTION OF THE PREFERRED EMBODIMENTS

Figure 3:
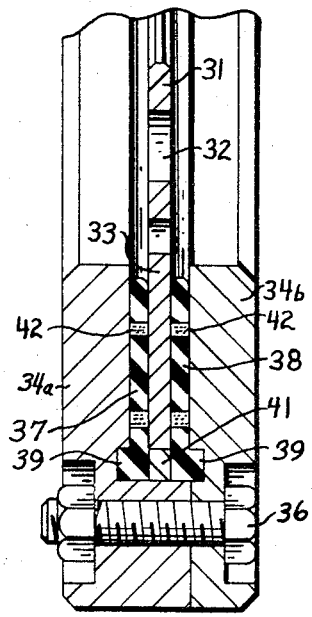
FIG. 3 is a fragmentary, sectional view similar to FIG. 2 but showing the invention embodied in a modified form of vibration damper.

Referring to the drawings, the assembly embodying the present invention comprises a generally annular shaped driving member 10. The driving member has a radially inwardly extending portion 11 which is adapted to be mounted on a hub, accessory drive pulley, or similar means conventionally associated with the crankshaft of a reciprocating engine. The inwardly extending portion 11 may be provided with a plurality of apertures 12 to receive bolts for attaching the driving member to the crankshaft (not shown). The driving member 10 is further provided with a radially outwardly extending flange 13.

The driven inertia member, indicated generally at 14, encircles the central portion of the driving member 10, supported on the sleeve bearing 15 and is provided with a cut-away portion 16 (FIG. 2) into which the flange 13 extends. The exterior surface of the inertia member 14 is formed to provide ribs or fins 19, which aid in the dissipation of heat from the assembly.

Interposed between the driven member 14 and the driving member 10 is an elastic element indicated generally at 24. The elastic element or means could be formed in one piece, however, as here illustrated, is formed by two members 24a and 24b which, when assembled, provide the elastic element with a generally U-shaped configuration. A clamping means, taking the form of annular cup 26, clamps the inertia member 14 to the flange 13, the interposed elastic element 24 being placed under compression by this clamping action. The material forming the elastic element is selected so that it has physical properties which provide the desired natural frequency for the damper.

Spaced around the circumference of the elastic element and extending through both sides thereof are a series of relatively small apertures 27. Prior to assembly of the damper, these apertures 27 are filled with a viscous material, preferably of the silicone fluid type. Upon assembly of the damper these pockets of fluid are permanently capsulated with the adjacent faces of the inertia element, flange 13 and retaining cup 26 confining the fluid as will be evident from FIG. 2.

In operation, vibratory forces acting on the damper produce shear stress in the elastic element 24 thereby transforming an increment of the total vibratory energy into thermal energy because of the internal friction of the elastic element. The vibratory forces further cause the viscous fluid in the apertures 27 to be worked due to distortion of the apertures. This working or agitation of the fluid results in the conversion of a further component of the total vibratory energy into heat. A further component of the total vibratory energy is converted to heat"

due to the shearing of whatever viscous fluid film exists between the elastitc element and the adjacent inertia element and driving member surfaces.

The fluid also acts as a lubricant to some extent. At high torque amplitudes, the lubricating action of the fluid allows slippage of the inertia member 14 and the retaining cup 26 with respect to the driven member flange 13. This lubricant-assisted slippage at high torques serves to relieve the elastic member 24 of the peak stresses which would be otherwise imposed on it and this serves to prolong the operational life of the elastic element. Since the fluid in the apertures 27 absorbs a component of the vibratory energy, the elastic element need not absorb all of the vibratory energy, thus certain types of elastomeric compounds may be utilized as elastic elements, these having lower hysteresis but less variation in their stiffness versus temperature response curves. Damper tuning for optimum performance can be accomplished by varying the modulus of elasticity of the elastic element and also by varying the volume and the viscosity of the viscous fluid in the apertures 27. The damper structure of the present invention combines the advantages of the viscous and the tuned dampers in a relatively simple, low cost structure.

Referring to FIG. 3, a modified form of damper, having bearing support for the inertia member at the periphery of the driven member flange, is illustrated. The driven member 31 has mounting apertures 32 and the radially extending flange 33 is the counterpart of the flange 13 of of FIG. 2.

Encircling the flange is the driven or inertia member formed by matching portions 34a and 34b bolted together as indicated at 36. The mating portions of the inertia member are undercut to provide a cavity accommodating the elastic element formed by elastic members 37 and 38. The elastic members extend slightly into grooves 39 in the inertia member to hold the members 37 and 38 in place in the assembly. The inertia member is supported for rotational freedom with respect to the peripheral margin of the driving member flange 33 by an annular bearing member 41, generally rectangular in cross-section and formed of a suitable antifriction material.

The elastic members 37 and 38 are provided with apertures 42, spaced about the members, and comparable to apertures 27 of FIGS. 1 and 2. These apertures contain a viscous material such as a viscous, silicone fluid and the fluid-filled apertures or cavities function, in this damper embodiment, to provide the same advantages as those described above with reference to the damper structure of FIGS. 1 and 2.

Figure 4:
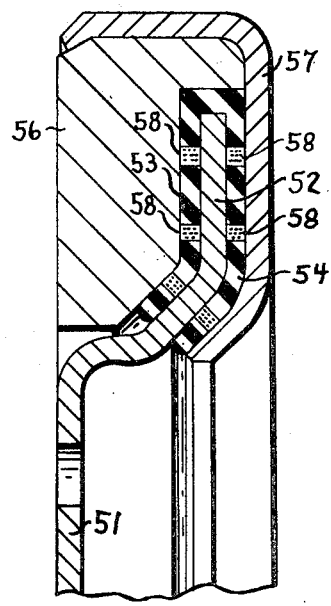
FIG. 4 is a fragmentary, sectional view similar to FIG. 3 but showing the invention embodied in a further modified form of vibration damper.

FIG. 4 illustrates the present invention embodied in a damper structure in which the elastic element is modified in configuration to provide both axial and radial support for inetria, or driven, member. In FIG. 4, the driving member is identified at 51 and its offset, radially extending flange 52 is accommodated within the elastic element which is generally U-shaped in cross-section with leg members 53 and 54 extending along the side faces of flange 52. The inertia member 56 is clamped to the assembly by the annular cup-shaped member 57.

The members 53 and 54 are provided with apertures 58, comparable to the apertures 27 of FIGS. 1 and 2, which are filled with a viscous fluid. The extension of the legs 53 and 54 of the elastic element over the inclined portion of the flange 52 provides radial support for member 56. The fluid-filled apertures or pockets in the elastic element provide the advantages referred to with respect to FIGS. 1 and 2.

Figure 5:
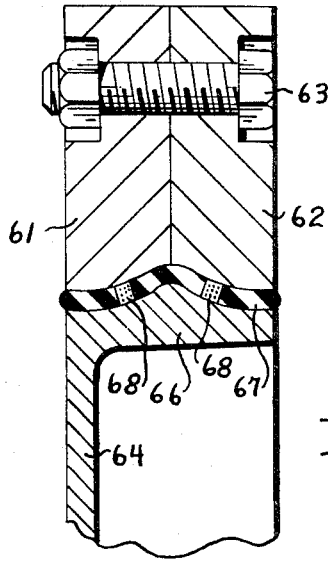
FIG. 5 is a fragmentary, sectional view similar to FIG. 4 but showing the invention embodied in a still further modified form of vibration damper.

FIG. 5 illustrates a damper of the type disclosed in Katzenberger U.S. Patent 2,992,569 wherein the elastic element, in cross-section, has gull-wing-like configuration. The inertia member is made up of two mating halves 61 and 62, bolted together as indicated at 63. The driving member 64 is formed to provide a sidewardly extending flange 66, the periphery of the flange having a contour formed by two intersecting surfaces corresponding to the contour of the adjacent face of the inertia member 61-62. As shown in FIG. 5, the intersecting surfaces are arcuate, however, they might be planar or one planar and one curved, and the contour might be formed by more than two intersecting surfaces. Interposed between the flange and the inertia member is an elastic element 67 having a series of spaced apertures 68 filled with a viscous fluid. The fluid filled apertures 68 are comparable to apertures 27 of FIGS. 1 and 2 and provide the same advantage initially discussed with reference to the structure shown in FIGS. 1 and 2.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

We claim:

1. A torsional vibration damper assembly for mounting in operative relation to a shaft subject to torsional vibration comprising a generally annular driving member adapted for concentric attachment to a shaft and having a radially outwardly extending surface, an annular elastic element and a driven inertia member both adjacent said extending surface of the driving member, means for clamping said inertia member to said driving member surface with said elastic element compressed therebetween, said elastic element having voids therein filled with a viscous fluid encapsulated within the damper assembly upon clamping of the inertia and elastic members to said driving member surface, whereby torsional vibration transmitted to said driving member is transformed into thermal energy by both the internal friction of the elastic of the element and the working of the fluid encapsulated in the voids in the elastic element.

2. A torsional vibration damper assembly as claimed in claim 1, in which the voids in said elastic element take the form of a series of apertures through the elastic element, the fluid in the apertures being confined by both said inertia member and said extending surface of the driving member.

3. A torsional vibration damper assembly as claimed in claim 1 in which the elastic element is generally U-shaped in cross-section and said extending surface of the driving member is formed by a radially outwardly extending flange, the extending flange being enclosed by said elastic element, said elastic element having viscous fluid filled apertures through both of its sides and spaced around its circumference, said clamping means comprising a cup which overlies one side of said elastic element and grips said inertia member holding it in overlying relation to the other side of said elastic element, said inertia element, flange and cup thus confining the fluid within said elastic element apertures.

4. A torsional vibration damper assembly as claimed in claim 1 in which an annular, anti-friction bearing is interposed between said driving member and said driven inertia member.

5. A torsional vibration damper assembly as claimed in claim 1 in which an annular groove is formed in said driven member into which a portion of said elastic element is deformed upon said compression of the elastic element to thereby anchor the elastic element radially within the assembly.

6. A torsional vibration damper assembly as claimed in claim 1 in which the elastic element is formed by two elastic members extending along the side faces of said radially outwardly extending flange, and in which an annular, anti-friction bearing is interposed between said elastic members and encircles the peripheral margin of said radially outwardly extending flange.

7. A torsional vibration damper as claimed in claim 1 in which said radially outwardly extending flange has a portion inclined with relation to the axis of rotation of the damper assembly and said elastic element has portions overlying said inclined portion of said flange.

8. A torsional vibration damper as claimed in claim 1 in which said radially outwardly extending flange is provided with a portion extending sidewardly generally parallel to the axis of rotation of the damper, said sidewardly extending portion being encircled by said inertia member with said annular elastic element interposed therebetween, the adjacent surfaces of said flange portion and of said inertia member having matching contours formed by intersecting surfaces.

9. A torsional vibration damper as claimed in claim 1 in which said radially outwardly extending flange is provided with a portion extending sidewardly generally parallel to the axis of rotation of the damper, said sidewardly extending portion being encircled by said inertia member with said annular elastic element interposed therebetween, the adjacent surfaces of said flange portion and of said inertia member having matching contours formed by intersection of two arcuate surfaces.

References Cited
UNITED STATES PATENTS

| | | | |
|---|---|---|---|
| 3,196,710 | 7/1965 | Peirce | 74—574 |
| 3,373,633 | 3/1968 | Desmond et al. | 74—574 |

FRED C. MATTERN, JR., *Primary Examiner.*

F. D. SHOEMAKER, *Assistant Examiner.*